June 18, 1957 — H. COANDA — 2,796,147
CYCLONE SEPARATOR

Filed Nov. 14, 1951 — 2 Sheets-Sheet 1

Inventor
Henri Coanda
By Robert E. Burns
Attorney

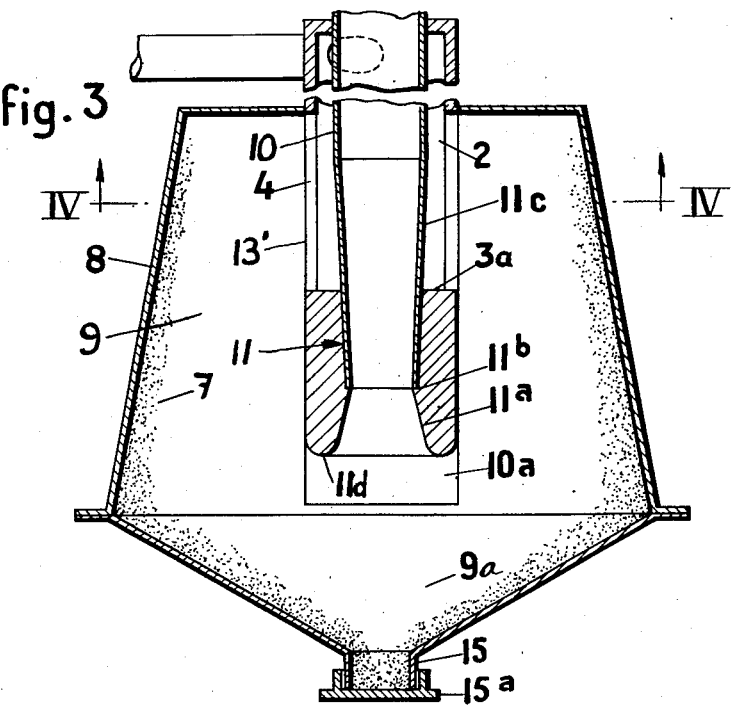
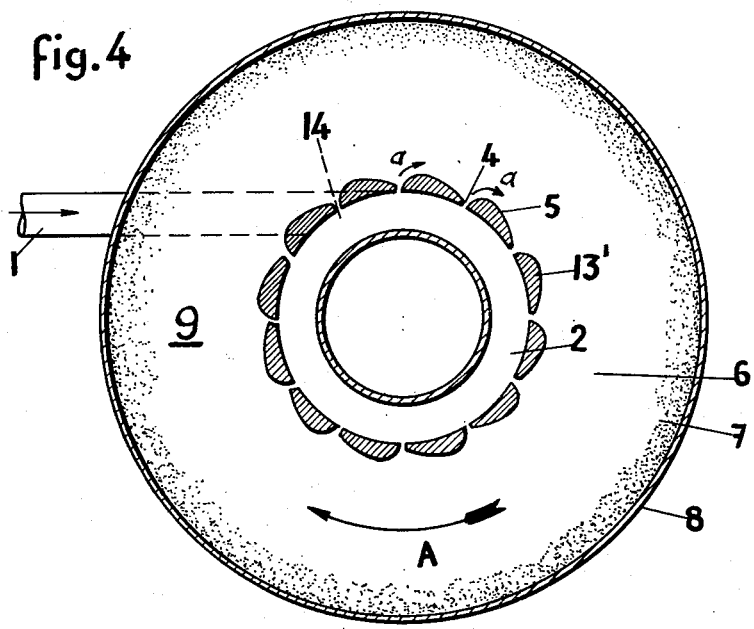

United States Patent Office 2,796,147
Patented June 18, 1957

2,796,147
CYCLONE SEPARATOR

Henri Coanda, Paris, France, assignor to Sebac Nouvelle S. A., Lausanne, Switzerland, a corporation of Switzerland Application November 14, 1951, Serial No. 256,256

Claims priority, application France November 18, 1950

6 Claims. (Cl. 183—87)

Several devices are actually in use under the generic name of cyclone devices for separating out particles of matter which are in suspension in a fluid when these particles are themselves of a density higher than that of the fluid.

The apparatus which forms the subject of the present invention utilizes the physical phenomenon, which is described in my U. S. Patent No. 2,052,869 and which is hereinafter referred to as the Coanda effect, for effecting the separation of the particles of matter which are in suspension in a fluid, and more particularly the separation of particles of matter from air, thereby stripping said fluid and more particularly said air from the particles in suspension therein.

The Coanda effect is apparent when a stream of fluid emerges from any container under a certain pressure, through a slot, if one of the lips of the slot orifice is extended and recedes continuously from the direction of the axis of said slot. Under such conditions, the fluid clings to the said extended lip and tends to increase its velocity, producing accordingly an underpressure and therefore a suction and an intake of gas.

By conveniently shaping this extended lip, e. g. by inscribing it into a circle of appropriate radius, as described in the aforementioned patent, and forming said lip either with a series of facets (or flat surfaces) or a facet and a continuously curved surface, it is possible, according to the invention, to provide a circular movement for the emergent fluid or air, the resultant centrifugal force throwing the suspended particles outwardly.

If such slots are disposed along the generatrices of a cylinder, the rotational movement beginning at each slot will be continued from one slot to the next one, and the bulk of the emerging air will continue to turn in a circle around the cylinder, the particles of matter in suspension in said emerging air being continuously thrown towards the periphery, due to the centrifugal force.

If this rotational movement takes place inside a container, the particles of matter are precipitated towards the walls, due to the centrifugal force, the center of the container being freed from dust, and the purified air or fluid can be extracted from the center of the container.

An apparatus according to the invention therefore comprises:

(a) A cylinder in the interior of which the gaseous or liquid fluid, carrying dust in suspension, is rotatably circulated;

(b) Slots, formed in the wall of said cylinder and placed along generatrices thereof, through which the fluid emerges from the interior of said cylinder, said slots being characterised in that one of the lips of their orifice is extended and recedes continuously from the direction of emergence of said slots, following a predetermined profile as fully described in aforementioned patent;

(c) A container which envelopes said cylinder and wherein the dust separated out of the fluid is collected;

(d) A central system for discharging the purified fluid.

The aforesaid and other objects, features and advantages of the invention will be more easily and fully understood from the illustration of two embodiments of an apparatus according to the invention, it being understood that the invention is not restricted to the details of the illustrated and described embodiments but is susceptible to modifications and adaptations.

In the attached drawings:

Fig. 3 is a diagrammatic vertical section of a second embodiment.

Fig. 4 is a horizontal section on the line IV—IV of Fig. 3 with a slightly enlarged scale.

Figure 1:
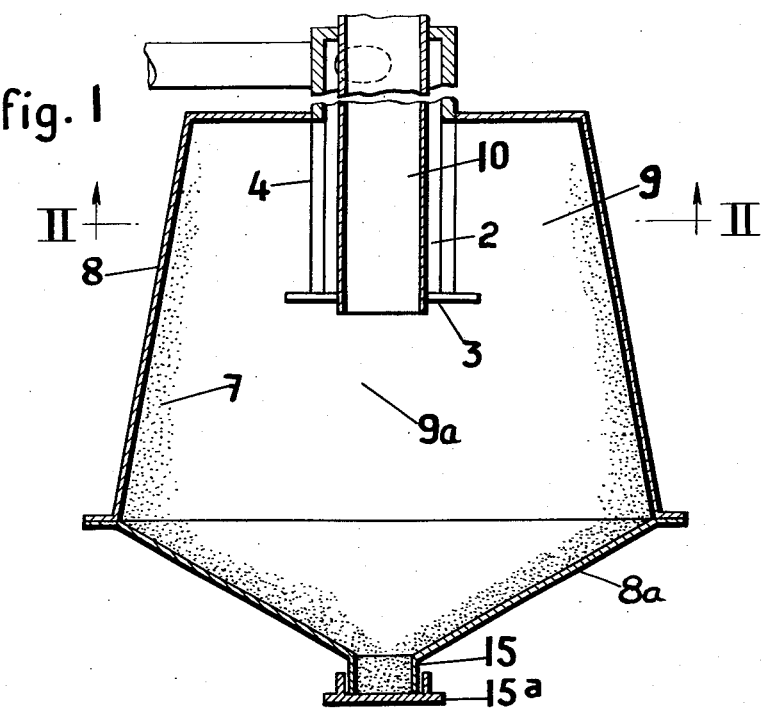
Fig. 1 is a diagrammatic vertical section of a first embodiment of a dust separating device in accordance with the invention.
Figure 2:
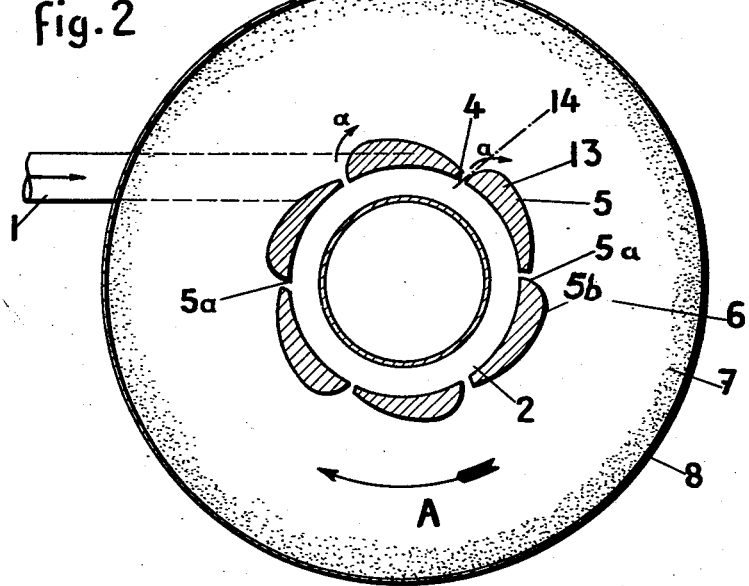
Fig. 2 is a horizontal section on the line II—II of Fig. 1 with a slightly enlarged scale.

In the device shown in Figs. 1 and 2, the fluid to be stripped from the contained dust enters tangentially by duct 1 and circulates around duct 10 in the annular space 2, while helically descending toward the closed end 3 of the annular space 2. The fluid emerges from the annular space 2 through narrow slots or gaps 4 provided between a circular series of circumferentially spaced vertical staves 13 arranged around and spaced from the duct 10. The staves 13 are shown in Fig. 2 as having an air foil cross section corresponding substantially to the profile of an airplane wing and are disposed with their chords approximately tangential to the cylinder defined by the staves 13 and with the leading edge of each stave spaced from the trailing edge of the preceding stave to provide the narrow slots or gaps 4 between successive staves 13. Each of the gaps 4 provides an orifice having a prolonged lip 5 comprising a flat facet 5a and a curved surface 5b receding continuously and progressively from the direction of the axis 14 of emergence of the fluid through the gaps 4.

In emergence through the gaps 4 into the surrounding space 9, the fluid closely follows the prolonged lips 5 of the orifices as indicated by the arrows a, due to the aforementioned Coanda effect, and continues to rotate in the direction of the arrow A in the surrounding space 9. By the resulting centrifugal force, the fluid frees itself from the suspended particles 7 which are thrown onto the surrounding wall 8. From the space 9 the stripped fluid flows downwardly into the communicating space 9a from which it is discharged upwardly through the centrally located discharged duct 10.

The dust thrown against the wall 8 falls down onto an inclined wall 8a and collects in a duct 15 closed by a removable plug 15a. When the duct 15 is full of dust, the plug 15a is withdrawn and the dust falls out and is collected in any suitable bag or container (not shown).

A second embodiment of the invention is shown in Figs. 3 and 4 in which the same parts are designated by the same reference numerals as in Figs. 1 and 2. The embodiment of Figs. 3 and 4 is like that of Figs. 1 and 2 except that the discharge duct 10 terminates in a Venturi 11 comprising a convergent portion 11a, throat 11b and divergent portion 11c which emerges into the duct 10. The fluid to be purified enters tangentially through the duct 1, rotates around the duct 10 and convergent portion 11c of the Venturi nozzle and escapes from the annular space 2 (closed at its bottom end by a collar 3a) through narrow slots or gaps 4 provided between staves 13' (Fig. 4) which are similar to staves 13 in Fig. 2 but have prolonged lips 5 forming a continuous curved surface receding continuously from the direction 14 of the axis of emergence of the fluid through the gaps 4. The fluid emerging from the annular space 2 through gaps 4 clings to the lips 5 as shown by the arrows *a* and continues to rotate in the direction of the arrow A, cleaning itself from the dust 7 which, being heavier than the air 6, is thrown onto the wall 8 surrounding space 9. The purified fluid flows down into the lower space 9a and is discharged through the Venturi nozzle 11 and connecting duct 10. A vertical blade 10a is shown provided in front of the rounded entrance lid of the Venturi nozzle 11 to prevent further rotation of the stripped fluid in the Venturi nozzle.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. A device for separating from a fluid, particles carried in suspension by said fluid, comprising a casing forming a separating chamber, said casing having a side wall and a bottom, means defining an inner chamber extending substantially vertically inside said casing and disposed substantially centrally of said casing with an annular space between said inner chamber and the side wall of said casing, said means defining the inner chamber comprising a circumferential series of staves extending longitudinally of said inner chamber and spaced circumferentially from one another to provide slots between successive staves, inlet means for supplying fluid with particles suspended therein to said inner chamber with a pressure differential between the inside and outside of said inner chamber to cause said fluid and particles to flow out through said slots, the corresponding outer surface of each of said staves being shaped to define a lip for the adjacent slot which lip diverges at a progressively increasing angle from the direction of emergence of said fluid from said inner chamber to produce circumferential movement of the fluid and particles flowing out through said slots into the annular space between the inner chamber and the side wall of said casing and thereby throwing said particles centrifugally toward the side wall of said casing to separate said particles from the fluid and collect them in said casing, means for discharging collected particles from the bottom of said casing and means defining a fluid outlet from said separating chamber, said fluid outlet being disposed substantially centrally of said casing and spaced upwardly from the bottom thereof, and means blocking the flow of fluid directly from said inner chamber to said outlet, the sole path of travel of said fluid from said inlet means being into said inner chamber, out through said slots into said separating chamber and from said separating chamber to said outlet.

2. A device for separating from a fluid, particles carried in suspension by the fluid, comprising a casing forming a separating chamber, said casing having a top, side wall and bottom, a substantially vertical cylinder extending down in said separating chamber and defining an inner chamber, said cylinder terminating at a distance above the bottom of said casing and being disposed centrally of said casing with an annular space between said cylinder and the side wall of the casing, said cylinder having a series of circumferentially spaced longitudinally extending slots opening from said inner chamber to said separating chamber, inlet means for supplying fluid with particles suspended therein to said inner chamber with a pressure differential between the inner chamber and the separating chamber to cause said fluid and particles to flow out through said slots, each of said slots having an extended lip that diverges at a progressively increasing angle from the direction of emergence of said fluid from the inner chamber to produce circumferential movement of the fluid and particles flowing out through said slots into the annular space between said cylinder and the side wall of said casing and thereby throwing said particles centrifugally toward the side wall of said casing to separate said particles from the fluid and collect them in said casing, means for discharging collected particles from the bottom of said casing, a fluid outlet conduit extending axially down through said cylinder with an annular space between said conduit and cylinder, said outlet conduit opening at its lower end into said separating chamber and means at the lower end of said cylinder closing said annular space between said conduit and cylinder to block the flow of fluid directly from said inner chamber to said outlet conduit, the sole path of travel of said fluid from said inlet means being into said inner chamber, out through said slots into said separating chamber and from said separating chamber to said outlet conduit.

3. A separator according to claim 2, in which said inlet opens tangentially into the annular space between said outlet conduit and cylinder in a direction to produce circumferential movement of said fluid in the same direction as that produced by said diverging lips of the slots in said cylinder.

4. A separator according to claim 2, in which said cylinder is formed by a circular series of vertically arranged staves which are spaced circumferentially from one another to form said slots between them.

5. A separator according to claim 4, in which said staves are of airfoil cross section with their chords approximately tangential to said cylinder.

6. A separator according to claim 2, in which the lower end of said outlet conduit opening into said separating chamber is Venturi-shaped.

References Cited in the file of this patent

UNITED STATES PATENTS

| | | |
|---|---|---|
| 772,689 | Allington | Oct. 18, 1904 |
| 934,727 | Hylander | Sept. 21, 1909 |
| 1,125,032 | Goodell | Jan. 12, 1915 |
| 1,573,135 | Bourne et al. | Feb. 16, 1926 |
| 1,753,972 | Schutz | Apr. 8, 1930 |
| 1,791,304 | Flick | Feb. 3, 1931 |
| 1,989,774 | Snow | Feb. 5, 1935 |
| 2,052,869 | Coanda | Sept. 1, 1936 |

FOREIGN PATENTS

| | | |
|---|---|---|
| 324,260 | Germany | Aug. 23, 1920 |
| 362,723 | Great Britain | Dec. 10, 1931 |
| 703,062 | France | Feb. 2, 1931 |
| 872,661 | France | Feb. 16, 1942 |
| 940,741 | France | June 7, 1948 |